US008166248B2

(12) United States Patent
Provenzano et al.

(10) Patent No.: US 8,166,248 B2
(45) Date of Patent: Apr. 24, 2012

(54) CACHING OF INFORMATION ACCORDING TO POPULARITY

(75) Inventors: Christopher A. Provenzano, Somerville, MA (US); Benedict J. Jackson, Beaverton, OR (US); Michael N. Galassi, Mist, OR (US); Carl H. Seaton, Forest Grove, OR (US)

(73) Assignee: ARRIS Group, Inc., Suwanee, GA (US)

( * ) Notice: Subject to any disclaimer, the term of this patent is extended or adjusted under 35 U.S.C. 154(b) by 518 days.

(21) Appl. No.: 12/001,837

(22) Filed: Dec. 12, 2007

(65) Prior Publication Data

US 2009/0043967 A1 Feb. 12, 2009

Related U.S. Application Data

(63) Continuation of application No. PCT/US2006/022880, filed on Jun. 12, 2006.

(51) Int. Cl.
*G06F 12/08* (2006.01)

(52) U.S. Cl. ......... 711/133; 711/E12.022; 711/E12.017; 711/136

(58) Field of Classification Search ............. None
See application file for complete search history.

(56) References Cited

U.S. PATENT DOCUMENTS

| 5,590,320 | A | 12/1996 | Maxey |
| 5,778,430 | A | 7/1998 | Ish |
| 7,133,971 | B2 | 11/2006 | Matick et al. |
| 2002/0087797 | A1 | 7/2002 | Adrangi |
| 2002/0103975 | A1 | 8/2002 | Dawkins |
| 2003/0005457 | A1 * | 1/2003 | Faibish et al. ............... 725/94 |
| 2003/0200393 | A1 | 10/2003 | Cornaby |

OTHER PUBLICATIONS

Johnson T L et al, "Run-Time Adaptive Cache Hierarchy Management Via Reference Analysis", 24th. Annual International Symposium on Computer Architecture. Denver, Jun. 2-4, 1997; [Annual International Symposium on Computer Architecture], New York, ACM, US,vol. Conf. 24, Jun. 2, 1997, pp. 315-326, XP000738167, ISBN: 978-0-7803-4175-3, * p. 315, right-hand column, paragraph 1,—paragraph 2 *, * p. 317, right-hand column, paragraph 2, * p. 318, right-hand column, paragraph 1,—p. 319, right-hand column, paragraph 2.

Haijin Yan et al., "Popularity Aware Cache Replacement in Streaming Environments", XP007911126, Proc. International Conference on Parallel and Distributed Computing Systems (PDCS2003), Aug. 2003.

EPO, Extended Search Report for application EP 06784798.8, mailed on Apr. 6, 2009.

EPO, Official Action for application EP 06784798.8, mailed on Jul. 17, 2009.

EPO, Official Action for application EP 06784798.8, mailed on Feb. 5, 2010.

International Search Report for PCT/US06/22880 mailed on Mar. 9, 2007.

* cited by examiner

*Primary Examiner* — Denise Tran
(74) *Attorney, Agent, or Firm* — Troy A. Van Aacken; Robert J. Starr

(57) ABSTRACT

A system includes logic to cache at least one block in at least one cache if the block has a popularity that compares favorably to the popularity of other blocks in the cache, where the popularity of the block is determined by reads of the block from persistent storage and reads of the block from the cache.

20 Claims, 4 Drawing Sheets

CACHING OF INFORMATION ACCORDING TO POPULARITY

PRIORITY CLAIM AND CROSS REFERENCE TO RELATED APPLICATIONS

This is a continuation of international application PCT/US06/22880, filed Jun. 12, 2006, which designated the United States and is now abandoned.

TECHNICAL FIELD

The present disclosure relates to caching techniques in data processing systems.

BACKGROUND ART

Data caching may provide performance improvements in data processing systems. Cache replacement techniques include least-recently-used and least-frequently-used. These techniques may, whenever a data block is read from mass storage, cache that block and thus remove from cache some other block. However, these techniques may not be entirely suitable in data processing systems that stream or otherwise manipulate large amounts of audio and/or visual (i.e. a/v) information.

DISCLOSURE OF THE INVENTION

A method may include and/or involve caching at least one block in at least one cache if the block has a popularity that compares favorably to the popularity of blocks in the cache, where the popularity of the block is determined by reads of the block from persistent storage and reads of the block from the cache. The caching at least one block in at least one cache if the block has a popularity that compares favorably to the popularity of blocks in the cache may include and/or involve caching the block if it is one or more of as popular, more popular, or as or more popular than at least one other block in the cache, and/or caching the block on a node of a multi-node stream server, the node where the block is cached including mass storage where the block is stored, and/or the popularity of the block determined at least in part by how many reads of the block have occurred from mass storage or cache over one or more intervals of time. The caching the block if it is as popular, more popular, or as or more popular than at least one other block in the cache, may include and/or involve caching the block if it is as popular as the at least one other block in the cache and more recently read than the at least one other block.

The method may include and/or involve not caching the block if the popularity of the block does not compare favorably with the popularity of the other blocks in the cache, even if the block is read more recently than at least some of the other blocks in the cache.

The method may include and/or involve replacing the block if the popularity of the block does not compare favorably with a replacement block, even if the block is read more frequently from cache than the replacement block is read from persistent storage.

The method may include and/or involve each node of a multi-node media server maintaining popularity of blocks persistently stored by the node.

The method may include and/or involve applying at least one decay function to block popularities. Applying at least one decay function to block popularities may include and/or involve reducing at least some of the block popularities after an amount of time has elapsed, and/or reducing the block popularities in a manner that preserves a popularity order, and/or applying the decay function as a result of at least one block reaching a popularity limit. Reducing at least some of the block popularities after an amount of time has elapsed may include and/or involve dividing at least some of the block popularities by some amount after the amount of time has elapsed.

Initializing at least some block popularities as a result of a startup and-or reset situation may include and/or involve initializing block popularities at least in part according to popularity histories of the blocks, and/or initializing block popularities at least in part according to the media streaming and-or viewing histories of programs including the blocks, and/or initializing block popularities at least in part according to popularities of blocks of adjacent storage locations. Initializing block popularities at least in part according to popularities of blocks of adjacent storage locations may include and/or involve initializing the block popularities at least in part according to popularity of blocks of adjacent RAID storage locations of different nodes of a media server hypercube.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

INDUSTRIAL APPLICABILITY AND MODES FOR CARRYING OUT THE INVENTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Hypercube Media Server

Figure 1:
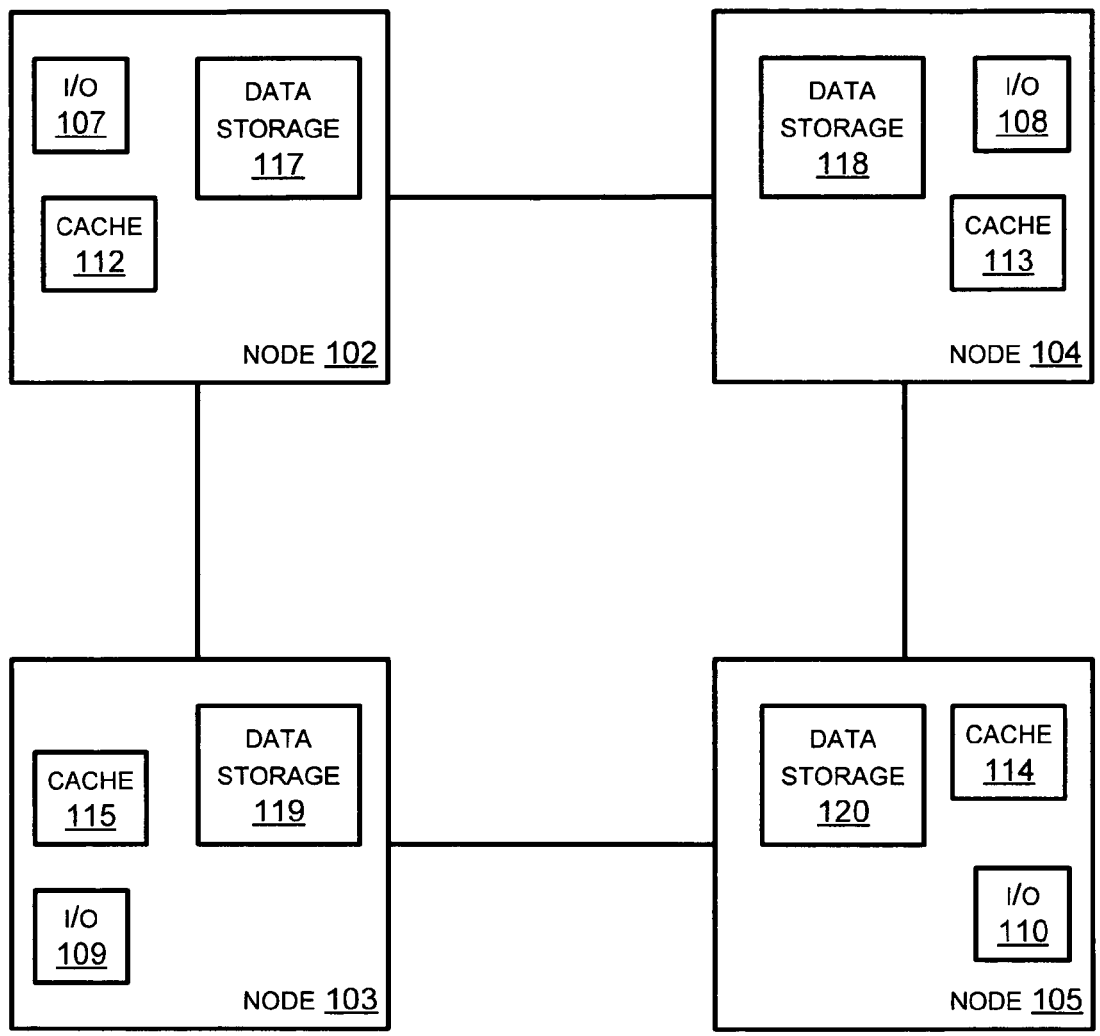
FIG. 1 is a block diagram of an embodiment of a hypercube media server.

FIG. 1 is a block diagram of an embodiment of a hypercube media server. The hypercube comprises nodes 102-105. The hypercube may comprise fewer or more nodes.

Each node 102-105 may comprise local mass storage 117-120, respectively. The mass storage 117-120 (a.k.a. persistent storage or data storage) may comprise blocks of media content. The media content may include content such as digital program episodes and/or movies. The content may be streamed by the hypercube via a media distribution system. In video-on-demand applications, media may be streamed to particular locations as a result of a subscriber requests.

The nodes 102-105 may comprise a local I/O interface 107-110, respectively. The I/O 107-110 may be used to distribute media streams to the media distribution plant for eventual delivery to subscribers.

A particular program may have blocks of its content located in the mass storage of more than one node. This is true even for sequential blocks of content, i.e., those blocks of content that would be viewed one after another as part of the same stream. For example, if blocks 10-25 comprise the opening scene of a movie, where block 10 is viewed first, block 11 next, etc., block 10 may be located on mass storage 117, block 11 on mass storage 120, block 12 on data storage 118, and so on. The media streaming system as presented in FIG. 1 does not assume any particular arrangement for block storage.

The nodes 102-105 may comprise local cache 112-115, respectively. The cache of a node may at any point in time contain blocks for one or more programs as well as other blocks. The nodes may store, either in their caches or elsewhere (such as other associated memory) other information concerning blocks. For example, popularity information may be stored for both cached blocks as well as those which are not currently cached.

When a media stream is created, blocks associated with it will be read, either from mass storage or a cache. The reading of any block from mass storage or cache may result in its popularity being increased. The popularity of sequential blocks or nearly sequential blocks of a stream may at times be expected to have similar values. The popularity of blocks may differ substantially when the blocks are widely separated in a stream or from different streams. For example, in some embodiments it is possible for some blocks to have a "reset", nominal, or minimum popularity and, at the same time, for a block or blocks of the same or other content to be approaching or at a popularity limit, meaning a maximum popularity.

Block Caching in a Media Server

A block may increase in popularity if it is read from either mass storage or a cache.

A method may include and/or involve caching at least one block if the block has a popularity that compares favorably to the popularity of blocks in the cache. Blocks may be cached by the nodes where the blocks are stored in mass storage, and/or by other nodes. In some embodiments, each node of a multi-node media server may maintain the popularity of blocks persistently stored by the node (e.g. stored in local mass storage of the node).

The caching at least one block which was read from mass storage in at least one cache if the block has a popularity that compares favorably to the popularity of other blocks in the cache may include and/or involve caching the block if it is one or more of as popular, more popular, or as or more popular than at least one other block in the cache. The block may be cached on a node of a multi-node stream server, the node where the block is cached including mass storage where the block is stored.

The caching the block if it is as popular, more popular, or as or more popular than at least one other block in the cache, may include and/or involve caching the block if it is as popular as the at least one other block in the cache and more recently read than the at least one other block.

The method may include and/or involve not caching the block if the popularity of the block does not compare favorably with the popularity of the other blocks in the cache, even if the block is read more recently than at least some of the other blocks in the cache.

The method may include and/or involve each node of a multi-node media server maintaining popularity of blocks persistently stored by the node.

The popularity of the block may be determined at least in part by how many reads of the block from mass storage or a cache have occurred over a period of time. The treatment of reads may be such that reads from differing time periods are accorded differing weightings in determining the popularity. The method may include and/or involve applying at least one decay function to popularities. Applying at least one decay function to popularities may include and/or involve reducing at least some of the popularities after an amount of time has elapsed, and/or reducing the popularities in a manner that preserves a popularity order, and/or applying the decay function as a result of at least one block reaching a popularity limit. Reducing at least some of the popularities after an amount of time has elapsed may include and/or involve dividing at least some of the popularities by some amount after the amount of time has elapsed.

Block popularities may be initialized as a result of a startup and-or reset situation, according to various factors. Initializing at least some block popularities as a result of a startup and-or reset situation may include and/or involve initializing block popularities at least in part according to popularity histories of the blocks, according to popularities of adjacent blocks (adjacent in a stream), and/or initializing block popularities at least in part according to popularities of blocks of adjacent storage locations. Initializing block popularities at least in part according to popularities of blocks of adjacent storage locations may include and/or involve initializing the block popularities at least in part according to popularity of blocks of adjacent RAID storage locations of different nodes of a media server hypercube.

Block popularities may be maintained for all blocks in the system. All blocks include those blocks currently cached, non-parity (also known as data) blocks not currently cached, and parity blocks not currently cached. A parity block comprises information such that it may be used to construct a data block if that data block needs reconstructing as a result of an error.

The popularity of parity blocks may be increased whenever either an actual read from mass storage or cache or a contingent (also known as an implied) read occurs. A contingent read may occur when a data block associated with the parity block is read; but, because no read error occurred, the parity block associated with the data block did not need to be read. No popularity increase for a parity block may occur as a result of a contingent read if that increase would make its popularity value as great as or greater than that of the least popular block currently in cache. As a consequence, no parity block will, as the result of a contingent read, replace a current block in cache.

Parity blocks may see their popularity increase as a result of an actual read from mass storage. Such a read may result in the parity block replacing a current block in cache. This may occur when the parity block's popularity increases so that it is larger than, or in some cases as large as, the popularity of one or more blocks currently cached.

As with all blocks, the popularity of a parity block may be increased if it is read from cache.

The popularity of parity blocks may be subject to a decay function. The decay function may operate as previously described.

Cache Configuration When Applying a Block-Popularity Cache Management Technique

Figure 2:
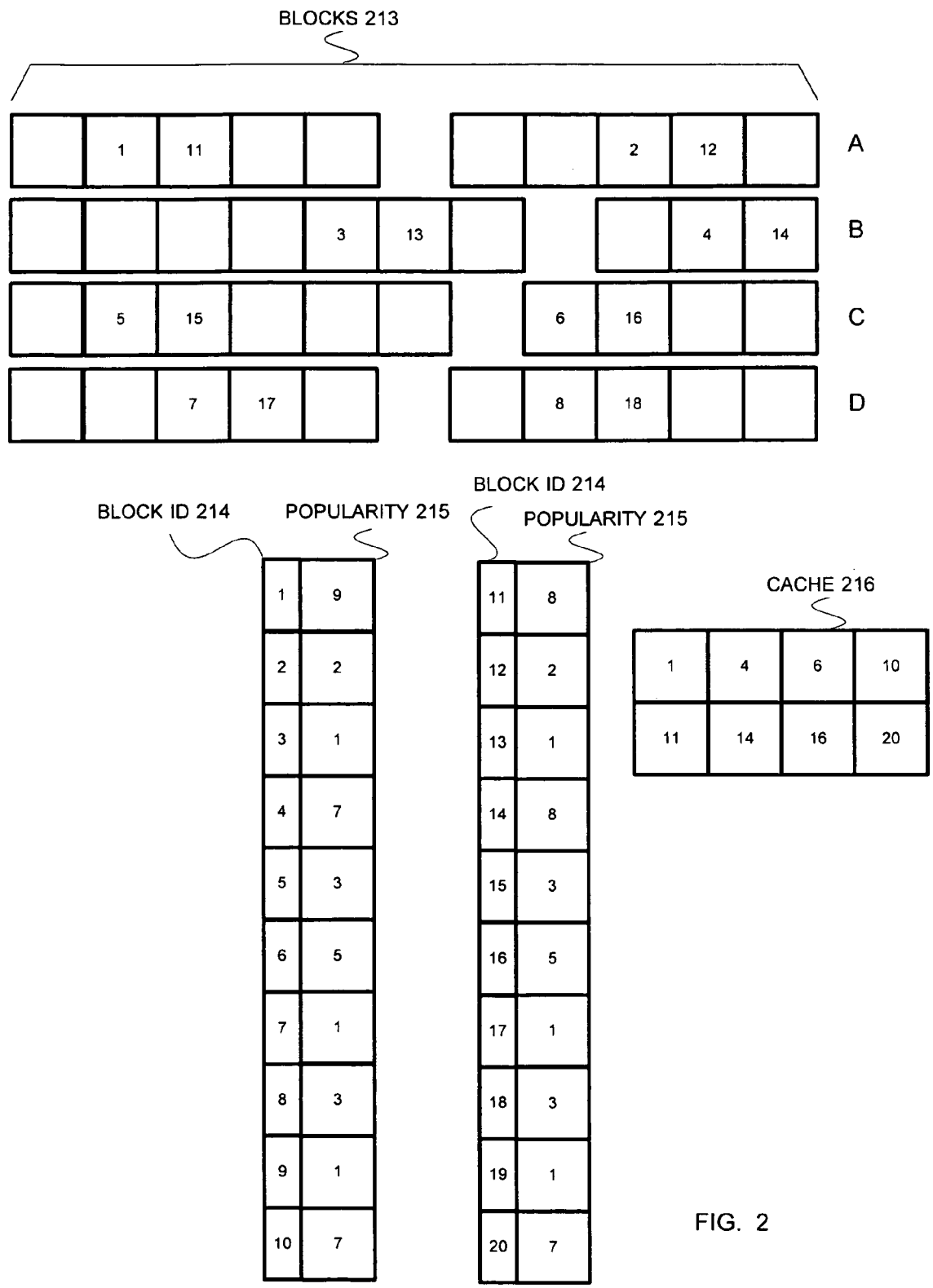
FIG. 2 is a block diagram of an embodiment of a cache configuration when applying a block-popularity cache management technique.

FIG. 2 is a block diagram of an embodiment of a cache configuration when applying a block-popularity cache management technique. Media streams A, B, C, and D, and blocks 213 are illustrated. Stream A comprises blocks 1, 11, 2, and 12. Stream B comprises blocks 3, 13, 4, and 14. Stream C comprises blocks 5, 15, 6, and 16. Stream D comprises blocks 7, 17, 8, and 18.

Block identifiers 214 are associated with popularities 215. Block identifiers 1-20 are illustrated. Block 1 has corresponding popularity 9, block 2 has popularity 2, block 3 has popularity 1, and so on.

The cache 216 comprises blocks 1, 4, 6, 10, 11, 14, 16, and 20. These are the blocks having the highest popularity at the moment of time illustrated, which is just before block popularities are increased as a result of the reading of the blocks comprising the illustrated media streams A-D. After the blocks 213 comprising these streams are read, the popularities of these blocks 213 may be increased. This may occur for both those blocks (example: block 2) which are not currently cached and for those blocks (example: block 1) which are. In our example, each popularity increases by 1. Thus block 2 will now have a popularity of 3 and block 1 a popularity of 10. As in this example all of the blocks in the cache still have popularities greater than those not cached, the cache will still comprise blocks 1, 4, 6, 10, 11, 14, 16, and 20.

Popularity Caching

According to one embodiment, a block is cached if the block has a popularity that compares favorably to the popularity of other blocks in the cache. For example, the block may be cached if it is as popular, more popular, or as or more popular than at least one other block in the cache. The block may be cached if it is as popular as another block in the cache and more recently and/or more frequently read than the other block.

A block may not be cached if the popularity of the block does not compare favorably with the popularity of the other blocks in the cache, even if the block was read more recently than the other blocks in the cache, and/or even if the block was read more frequently than the other blocks in the cache.

Block-Popularity Cache Management Technique

Figure 3:
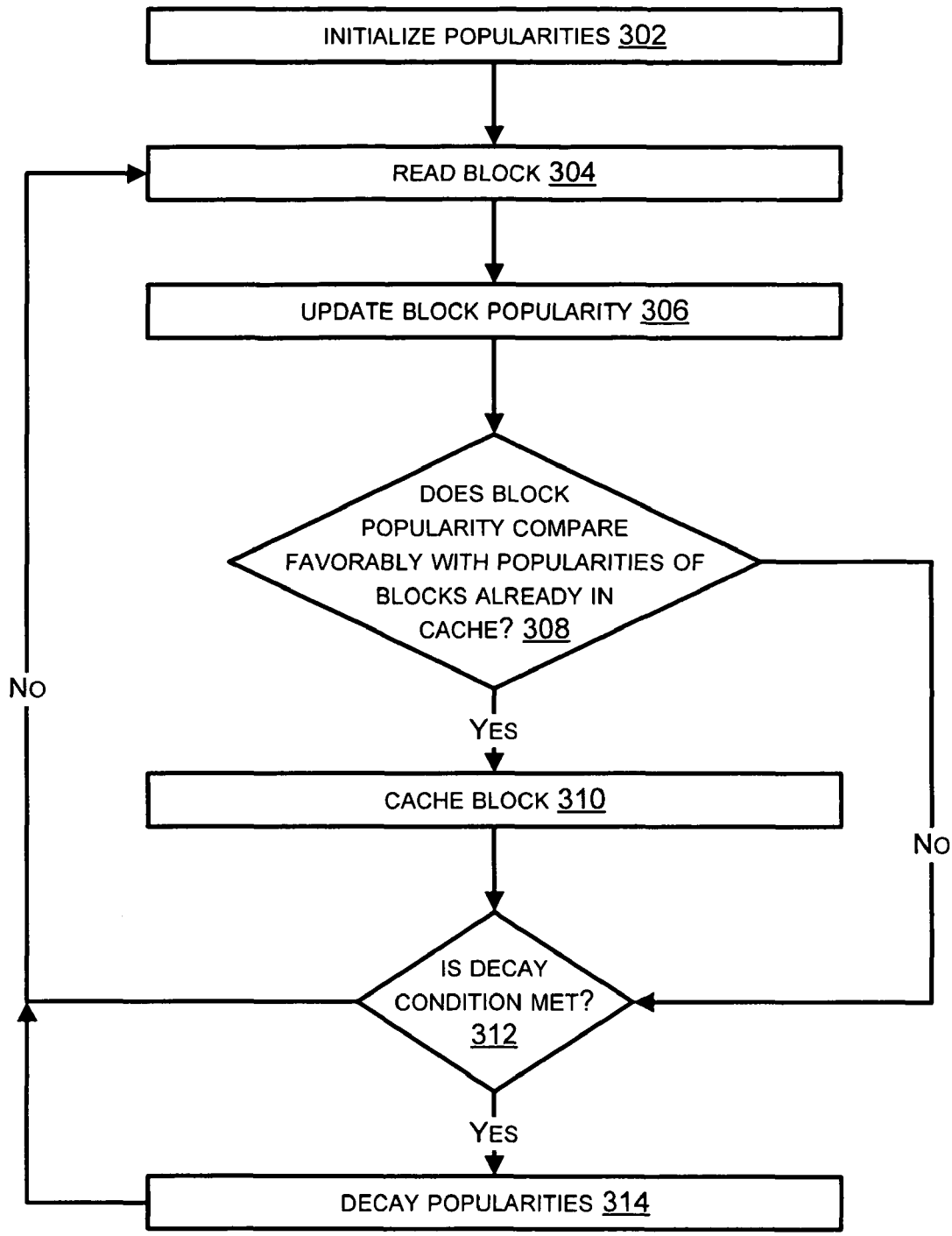
FIG. 3 is a flow chart of an embodiment of a block-popularity cache management technique.

FIG. 3 is a flow chart of an embodiment of a block-popularity cache management technique. The technique illustrated is for blocks which are not parity blocks.

At 302, popularities are initialized, for example at the time of a reset or boot up of one or more nodes. Initialization may be provided by operating system logic, logic of a particular node, or other logic of the system. Initialization may occur over a period of time as media streams corresponding to different programs are requested.

At 304, a block is read either from persistent data storage or the cache. The block popularity is updated at 306. When the block is read as a result of stream creation, the stream comprising the block may be output by the same node from which the block is read, or a different node.

At 308, the block popularity is examined to determine if it compares favorably to the popularities of other blocks currently in the cache. If the block is already cached, this step may be skipped and the process may jump to 312. If the cache is not full, this comparison step may be skipped and the process may jump to 310.

At 310, the block popularity compared favorably with at least one currently cached block (or the cache was not full), and so the block is cached. If the cache was full, caching the block may involve eliminating another block with a less favorable popularity from the cache. In some embodiments, a popularity may be considered to compare favorably with that of another block if it is equal to the popularity of that other block and its block was more recently read.

At 312, the value of the updated popularity is examined to determine if it meets a decay condition. The updated popularity may meet the decay condition if it equals or exceeds a popularity limit, for example, or if a period of time has elapsed or due to some other condition.

At 314, the decay condition was met, and thus the popularity values are adjusted. This adjustment may occur for a portion of, or for all popularities controlled by a node or for multiple nodes of a media server. The adjustment may be made in various ways, for example by decreasing all affected popularities by dividing them by a value greater than one (1).

At 304, another block is read and the process repeats.

Popularity Decay

One or more decay functions may be applied to adjust block popularities. The decay function(s) may act to reduce at least some of the block popularities after an amount of time has elapsed. For example, the decay functions may be applied to divide at least some of the block popularities by some amount after the amount of time has elapsed. In general, the decay functions may act to reduce the block popularities in a manner or manners that preserve the popularity order.

In some embodiments, application of the decay function may be triggered by some event. For example, the decay function may be applied as a result of at least one block reaching a popularity limit.

In some embodiments, decay may be applied after an amount of activity has occurred in the system as a whole, or any part of the system, since the last decay function was applied. For example, decay may be applied after a number of combined block reads for blocks grouped into various subsystems, such as one or more particular nodes, one or more disks, combinations of nodes and disks, and so on.

Parity Block-Popularity Cache Management Technique

Figure 4:
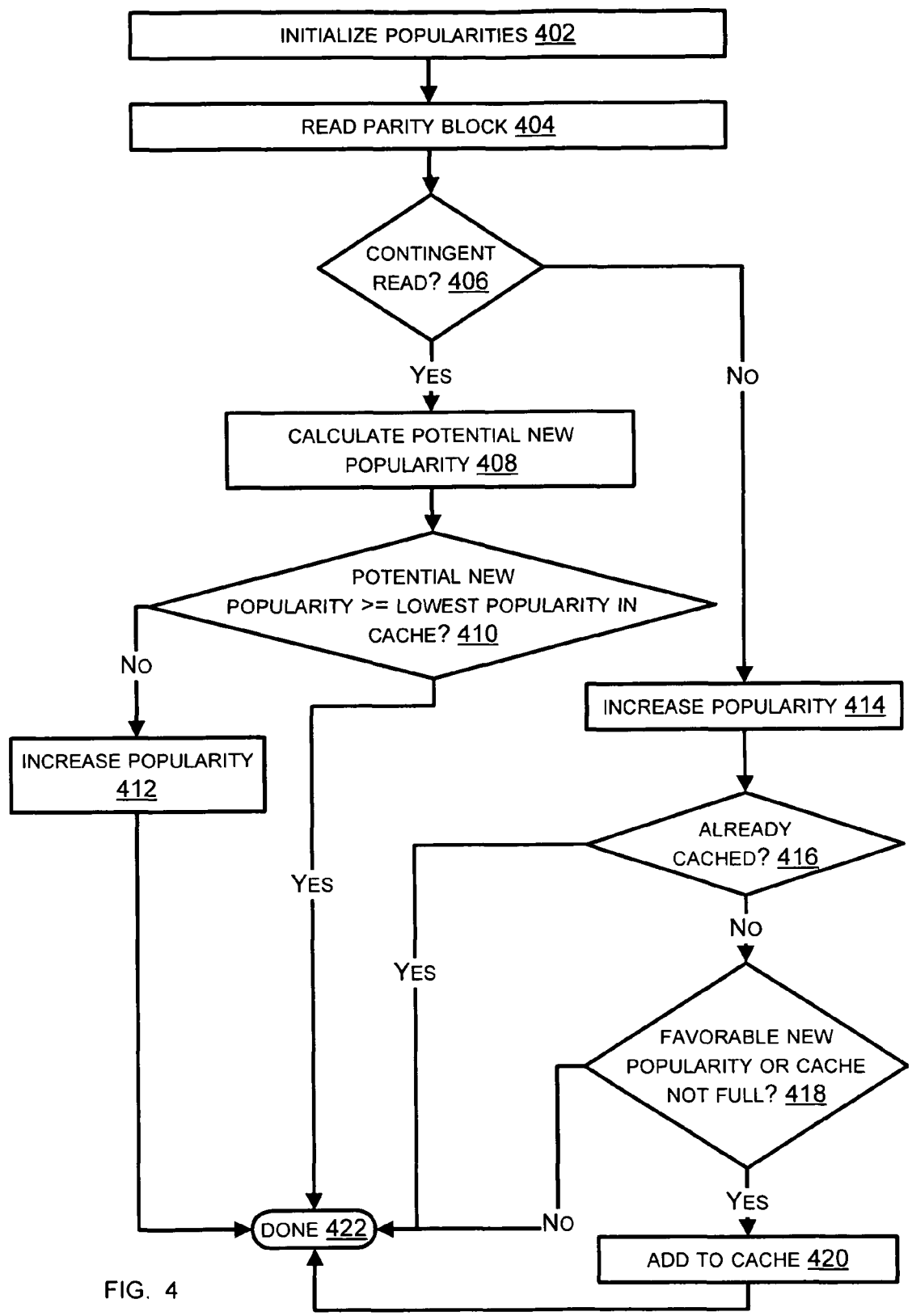
FIG. 4 is a flow chart of an embodiment of a block-popularity cache management technique involving parity blocks.

FIG. 4 is a flow chart of an embodiment of a block-popularity cache management technique involving parity blocks.

At 402, popularities are initialized, for example at the time of a reset or boot up of one or more nodes. Initialization may be provided by operating system logic, logic of a particular node, or other logic of the system. Initialization may occur over a period of time as media streams corresponding to different programs are requested. In one embodiment, the popularity of parity blocks is initialized to a value that is slightly less or equal to the popularity of the least popular block in the cache.

At 404, a parity block is read either from persistent data storage or the cache. The read may be an actual read from persistent data storage or cache; or, the read may be a contingent read.

At 406, it is determined if the read is an actual read of the parity block, or a contingent read.

At 408, if the read was contingent, the potential new popularity of the block is calculated. In other words, the value that the updated popularity would have is calculated.

At 410, the potential new popularity is examined to determine if it compares favorably to the popularity of at least one other block currently in the cache. If not, the popularity is increased at 412. If so, the popularity is not increased, so that a contingent read of a non-cached block will not result in the block being cached.

At 414, if the read of the parity block was not contingent, the block popularity is increased. If at 416 the block was already cached, the process concludes at 422. Otherwise, at 418, it is determined if the block has a favorable new popularity, or if the cache is not full. In either case, the block is added to the cache at 420.

In some embodiments, if a parity block is already cached, even a contingent read may result in updating the popularity of the cached parity block.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:
    caching at least one block in at least one cache if the block has a popularity that compares favorably to the popularity of blocks in the cache, where the popularity of the block is determined by real reads of the block from persistent storage and reads of the block from the cache;
    only when the block is a parity block, the popularity of the block is determined by reads of the block from persistent storage and reads of the block from the cache, whether real or contingent.

2. The method of claim 1, wherein the caching at least one block in at least one cache if the block has a popularity that compares favorably to the popularity of blocks in the cache further comprises:
    caching the block if it is one or more of as popular, more popular, or as or more popular than at least one other block in the cache.

3. The method of claim 2, wherein the caching the block if it is as popular, more popular, or as or more popular than at least one other block in the cache, further comprises:
    caching the block if it is as popular as the at least one other block in the cache and more recently read than the at least one other block.

4. The method of claim 1, wherein the caching at least one block in at least one cache if the block has a popularity that compares favorably to the popularity of blocks in the cache further comprises:
    caching the block on a node of a multi-node stream server, the node where the block is cached comprising mass storage where the block is stored.

5. The method of claim 1, wherein the caching at least one block in at least one cache if the block has a popularity that compares favorably to the popularity of blocks in the cache further comprises:
    the popularity of the block determined at least in part by how many reads of the block have occurred from mass storage or cache over one or more intervals of time.

6. The method of claim 1, further comprising:
    not caching the block if the popularity of the block does not compare favorably with the popularity of the other blocks in the cache, even if the block is read more recently than at least some of the other blocks in the cache.

7. The method of claim 1, further comprising:
    replacing the block if the popularity of the block does not compare favorably with a replacement block, even if the block is read more frequently from cache than the replacement block is read from persistent storage.

8. The method of claim 1, further comprising:
    each node of a multi-node media server maintaining popularity of blocks persistently stored by the node.

9. The method of claim 1, further comprising:
    applying at least one decay function to block popularities.

10. The method of claim 9, wherein applying at least one decay function to block popularities further comprises:
    reducing at least some of the block popularities after an amount of time has elapsed.

11. The method of claim 10, wherein reducing at least some of the block popularities after an amount of time has elapsed further comprises:
    dividing at least some of the block popularities by some amount after the amount of time has elapsed.

12. The method of claim 9, wherein applying at least one decay function to block popularities further comprises:
    reducing the block popularities in a manner that preserves a popularity order.

13. The method of claim 9, wherein applying at least one decay function to block popularities further comprises:
    applying the decay function as a result of at least one block reaching a popularity limit.

14. The method of claim 1, further comprising:
    initializing at least some block popularities as a result of a startup and-or reset situation.

15. The method of claim 14, wherein initializing at least some block popularities as a result of a startup and-or reset situation further comprises:
    initializing block popularities at least in part according to popularity histories of the blocks.

16. The method of claim 14, wherein initializing at least some block popularities as a result of a startup and-or reset situation further comprises:
    initializing block popularities at least in part according to the media streaming and-or viewing histories of programs comprising the blocks.

17. The method of claim 14, wherein initializing at least some block popularities as a
    result of a startup and-or reset situation further comprises:
    initializing block popularities at least in part according to popularities of blocks of adjacent storage locations.

18. The method of claim 17, wherein initializing block popularities at least in part according to popularities of blocks of adjacent storage locations further comprises:
    initializing the block popularities at least in part according to popularity of blocks of adjacent RAID storage locations of different nodes of a media server hypercube.

19. A system comprising:
    machine memory or non-transitory machine-readable media embodying logic to cache at least one block in at least one cache if the block has a popularity that compares favorably to the popularity of other blocks in the cache, where the popularity of the block is determined by real reads of the block from persistent storage and reads of the block from the cache; only when the block is a parity block, the popularity of the block is determined by reads of the block from persistent storage and reads of the block from the cache, whether real or contingent.

20. The system of claim 19, wherein the logic to cache at least one block if the block has a popularity that compares favorably to the popularity of other blocks in the cache further comprises:
    machine memory or non-transitory machine-readable media embodying logic to cache the block if it is one or more of as popular, more popular, or as or more popular than at least one other block in the cache.

* * * * *